Dec. 19, 1939.   J. BRENZINGER   2,183,738
METHOD OF MAKING CAN BODIES
Filed May 5, 1936   2 Sheets-Sheet 2
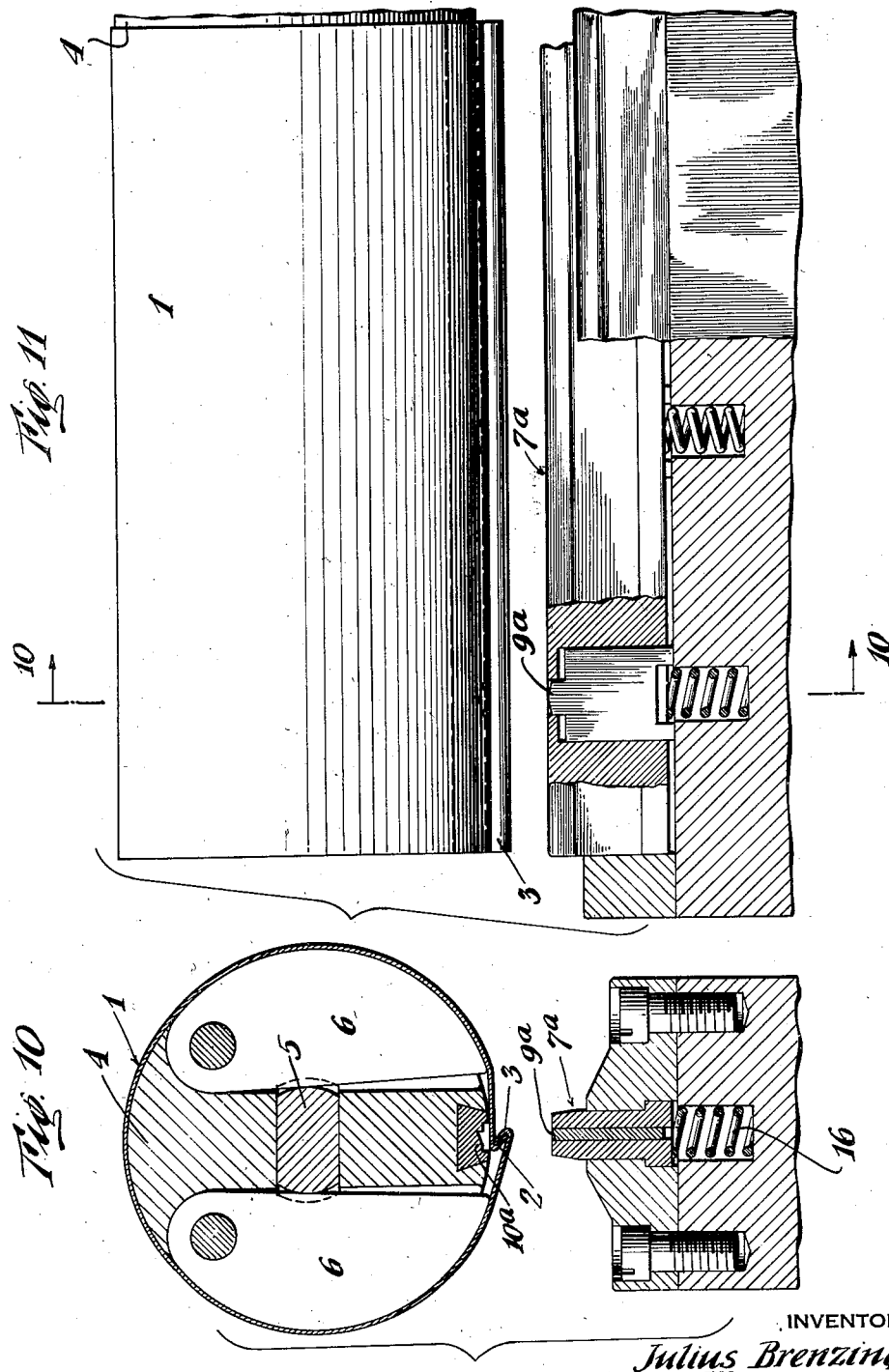

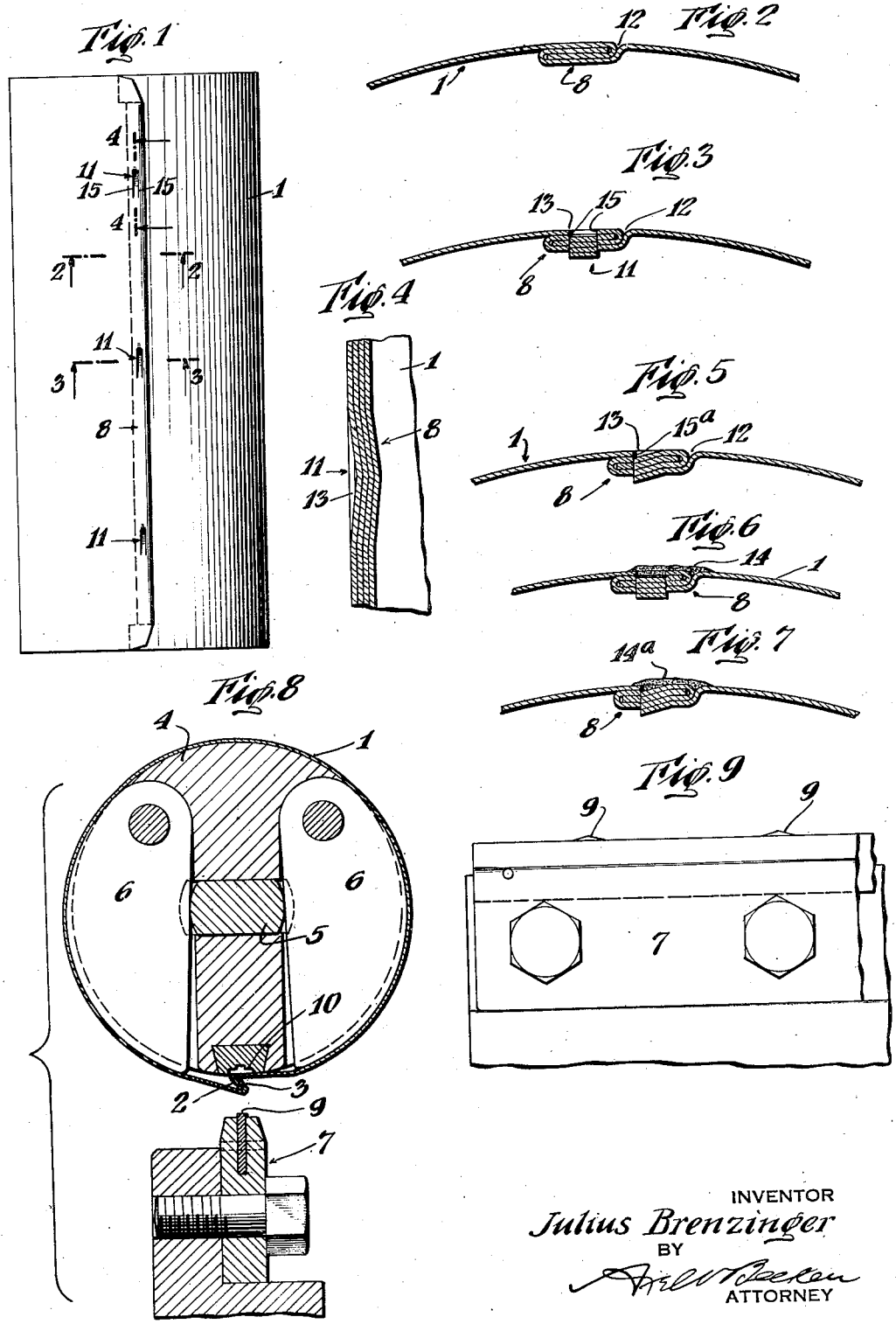

Patented Dec. 19, 1939

2,183,738

UNITED STATES PATENT OFFICE

2,183,738

METHOD OF MAKING CAN BODIES

Julius Brenzinger, Fairfield, Conn.

Application May 5, 1936, Serial No. 77,939

2 Claims. (Cl. 113—120)

The present invention relates to a method of making can bodies, and has for its main object and feature the production of a can body with an unusually strong side seam capable of withstanding a high internal pressure in the can without opening the seam.

In the accompanying drawings the invention is disclosed in several concrete and preferred forms in which Fig. 1 is a view in side elevation of a can body embodying the invention;

Fig. 2 is a detail sectional view substantially on the plane of line 2—2 of Fig. 4;

Fig. 3 is a detail sectional view substantially on the plane of line 3—3 of Fig. 1;

Fig. 4 is a detail sectional view substantially on the plane of line 4—4 of Fig. 1;

Fig. 5 is a detail sectional view similar to Fig. 3, but showing a modification of the invention;

Fig. 6 is a view similar to Fig. 3 with the solder applied to the seam and the interstices thereof;

Fig. 7 is a view similar to Fig. 5 also with the solder applied to the seam and the interstices thereof;

Fig. 8 is a transverse sectional view of a collapsible horn, with the body in position, and a hammer to clinch the seam and a cutting device to sever said seam at one or more points;

Fig. 9 is a fragmentary detail view in side elevation of the hammer shown in Fig. 8;

Fig. 10 is a view similar to Fig. 8 but showing a modified cutting device to produce the seam of Fig. 5, the section being substantially on the plane of line 10—10 of Fig. 11; and Fig. 11 is a view partly in side elevation and partly in section of the parts shown in Fig. 10.

Body 1 is made up of a blank of sheet material having, at its opposite edges, opposed hooks 2 and 3. The body is formed around horn 4 while the latter is collapsed and the hooks are caused to interengage, after which the horn is expanded by taper member 5 acting on pivoted wings 6 and the hooks interlock under tension. 7 indicates a hammer having a reciprocatory movement toward and away from the horn to clinch the hooks, while under tension, into a seam as 8. Carried by the hammer is one or more cutting tools 9 and on the horn there is one or more complementary cutting elements 10. The result is that during the action of clinching the seam, complementary cutters 9 and 10 partially sever and displace the sheet material of the seam at one or more points in its length. The effect can readily be understood by considering Figs. 1–4, in which Fig. 2 shows the ordinary seam 8 that is clinched or flattened by the hammer, but at a number of points 11 (Fig. 1) the material of the seam is partially severed. One of these points is shown in section in Figs. 3 and 4 from which it appears that the material is not merely indented but actually severed and displaced inwardly. Owing to the fact that there are four layers of metal an unusually strong joint is formed. The joint 12 of the seam, as well as the interstices as 13 of the partially severed material is now preferably covered or filled with a body of solder 14 (Fig. 6) and it has been found that the solder insinuates itself into the various crevices or interstices to such an extent that a very complete seal is formed.

In the construction thus far described the severance of the seam takes place on two parallel lines 15 extending lengthwise of the seam, but in Figs. 5, 7, 10 and 11 a modified construction is shown. As there disclosed, the complementary cutting members 9a and 10a are so shaped that the cutting action takes place only along one line 15a and the metal of the seam is distorted as shown in Fig. 5. Thereafter a body of solder 14a is used to cover the joint and interstices of the seam as will be understood.

In the form of the invention shown in Fig. 8 cutting member 9 and the hammer are rigidly mounted with respect to each other, the cutting member projecting a slight distance above the face of the hammer. In the modification shown in Figs. 10 and 11, hammer 7a is mounted on a spring 16 and normally is flush with the cutting tool, which latter is mounted rigidly. When the hammer strikes the hooks of the blank to form the seam, it recedes somewhat owing to the spring and allows the cutting tool to act.

The article of manufacture, the can body, is not claimed herein but forms the subject matter of another application Ser. No. 204,808, filed April 28, 1938.

The apparatus for carrying on the method of this application is not claimed herein but forms the subject matter of another application Ser. No. 261,690, filed March 14, 1939.

I claim:

1. The method of forming the longitudinal seam of a sheet-material body which consists in: providing the opposite edges of a blank with opposed hooks; forming the blank into a body with the hooks interengaged; interlocking the hooks under tension; and clinching the hooks, while under tension, into a seam and during the action of clinching partially severing the material of the seam at one or more points at spaced intervals and displacing the layers thereof inwardly.

2. The method of forming the longitudinal seam of a sheet-material body which consists in: providing the opposite edges of a blank with two continuous and opposed hooks; forming the blank into a body with the hooks interengaged; interlocking the hooks under tension; clinching the hooks, while under tension, into a seam and during the action of clinching partially severing the material of the seam at one or more points at spaced intervals and displacing the layers thereof inwardly; and applying solder to the seam and the interstices of the partially severed material thereof.

JULIUS BRENZINGER.

CERTIFICATE OF CORRECTION.

Patent No. 2,183,738. December 19, 1939.

JULIUS BRENZINGER.

It is hereby certified that error appears in the printed specification of the above numbered patent requiring correction as follows: Page 1, second column, line 48, claim 1, after the word "with" insert two continuous and; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal)